United States Patent
Bauza (10) Patent No.: US 7,124,452 B1
(45) Date of Patent: Oct. 24, 2006

(54) SHOWER TEMPERATURE DISPLAY

(76) Inventor: Pedro J. Bauza, 15383 SW. 42 Ter., Miami, FL (US) 33185

( * ) Notice: Subject to any disclaimer, the term of this patent is extended or adjusted under 35 U.S.C. 154(b) by 215 days.

(21) Appl. No.: 10/784,094

(22) Filed: Feb. 23, 2004

(51) Int. Cl.
*A47K 3/28* (2006.01)

(52) U.S. Cl. .......................... 4/605; 374/148
(58) Field of Classification Search ............... 4/605; 374/147, 148
See application file for complete search history.

(56) References Cited

U.S. PATENT DOCUMENTS

| | | | | |
|---|---|---|---|---|
| 4,509,550 A | * | 4/1985 | Monk | 374/148 X |
| 4,854,499 A | * | 8/1989 | Neuman | 4/605 X |
| 5,944,255 A | | 8/1999 | Shirmohamadi | 236/12.12 |
| 6,892,952 B1 | * | 5/2005 | Chang et al. | 236/12.12 |

* cited by examiner

*Primary Examiner*—Robert M. Fetsuga
(74) *Attorney, Agent, or Firm*—Sanchelima & Assoc.

(57) ABSTRACT

An electronic shower temperature display device that connects directly to an existing shower arm and showerhead assembly comprising a sensor coupling unit, panel support bracket, and a display panel assembly. Microprocessor-based circuitry monitors both temperature and the presence or absence of water through the device and the showerhead. The device displays real-time shower temperature on a self-contained unit consisting of a position adjustable display panel. A programmable memory storage system is used for retrieving multi-user temperature settings, whereby provides an audible tone when the desired temperature is arrived at. A programmable temperature scorching setting provides protection from scorching by signaling an audible warning tone when the shower temperature has gone passed a preset temperature. The device displays true water temperature by monitoring temperature and water conductivity inside the sensor-coupling unit.

1 Claim, 7 Drawing Sheets

SHOWER TEMPERATURE DISPLAY

BACKGROUND OF THE INVENTION

1. Field of the Invention

The present invention relates to temperature display systems, and more particularly, to a device used to display real-time temperature of water delivered by a showerhead.

2. Description of the Related Art

Several designs for water temperature display systems have been designed in the past. None of them, however, includes a real-time temperature display that is installed directly to an existing shower arm and showerhead, without modification of any in-wall plumbing system. In addition, none of them include an adjustable LCD display panel to provide optimal viewing angles.

Typical shower temperature control systems consist of cumbersome and expensive adaptations that require replacement of existing plumbing systems, including installation of electrical wiring. These modifications are very expensive and time consuming; furthermore, most consumers are not eager to dismantle their bathroom walls or wall tiles for devices that practically have no market presence or time-tested reliability. If the typical shower temperature control system were to fail, the user would have a second expense of having to rebuild the plumbing system back to its originality. Other shower temperature control systems require retrofitting devices that control a mixing chamber and mount on an outside wall, but only when the hot and cold water have a dependent valve control. These devices would not work on typical shower systems that have independent hot and cold controls prior to a mixing chamber.

In addition, other systems fail by displaying water temperature that is nonexistent. When water flow is not present, typical temperature sensors continue to read the internal and external temperatures of the mixing chamber, coupling, and pipes caused by heating retention of the materials. This thermo affect causes these type of systems to display a temperature, even when water is not present or being discharging through the showerhead.

Applicant believes that the closest reference corresponds to U.S. Pat. No. 5,944,255 issued to Shirmohamadi for Shower water automatic temperature controller on Aug. 31, 1999. However, it differs from the present invention because Shirmohamadi teaches a self-contained unit 160 that rapidly and accurately senses, controls and maintains the temperature of water delivered to the user of a shower or bath. The invention allows a user to preset a desired water temperature using a manual control interface 60 and uses a sensor 10 located on (or within) the mixer outlet pipe 20 to measure the temperature of the mixed water being delivered to the user. The sensor produces an input signal that is used by a microprocessor 30 to calculate both derivative gain and proportional gain, and fuzzy logic may also be used by the microprocessor to produce an output signal, such that the system responds quickly and accurately to both quantum temperature changes and to the rate of temperature change. The output signal controls a motor 80 that via the action of gears 90, controls the action of the water mixer valve 110 thus maintaining a constant temperature of water delivered to the user. The invention also allows a number of users to preset temperatures for their own comfort, and to select this preset temperature before entering the shower, so negating the need for manual "trial and error" adjustment. Importantly, the invention is also designed so that any layperson, with no plumbing experience and the minimum of mechanical ability may retrofit the device to an existing water delivery system.

Other patents describing the closest subject matter provide for a number of more or less complicated features that fail to solve the problem in an efficient and economical way. None of these patents suggest the novel features of the present invention. There are no similar water temperature display systems to the best of applicant's knowledge, having a real-time temperature display that is installed directly to an existing shower arm and showerhead, without modification of any in-wall plumbing system and has an adjustable LCD display panel to provide optimal viewing angles.

SUMMARY OF THE INVENTION

The present invention departs from the conventional concepts of shower control systems, and in so doing, provides a device that is less costly and simplifies installation while providing the ideal shower temperature device. This present invention provides users with precise manual control of shower temperatures by displaying temperature in real time. Thus, a user can manually adjust the water temperature to a desired setting by viewing the temperature display panel, while making the necessary hot and cold water adjustments without the fear that the battery will fail and the water will shut off in midst of their shower. The present invention employs a unique system that senses when water is not discharging through the showerhead. Circuitry detects the absence of water in a coupling assembly and displays a non-temperature reading in response.

More specifically, the instant invention is an electronic shower temperature display for shower assemblies including a showerhead, comprising temperature-sensing means having a first input connected to a shower arm of the shower assemblies and a first output generating a voltage signal as a function of temperature sensed by the first input. Computerized means have a second input connected to the first output for processing the signal to generate a second output signal and display means connect to the second output signal.

Yet more specific, the instant invention is an electronic shower temperature display device which can be easily retrofitted onto an existing shower arm and showerhead assembly of a shower system for a water delivery system that consist of either a dependent or independent hot and cold controls prior to a mixing chamber, comprising a sensor-coupling unit housing a temperature sensor, a panel support bracket, and a temperature display adjustable display panel assembly. The adjustable display panel assembly has a microprocessor-based circuitry with means to display real-time water temperature. The microprocessor-based circuitry communicates with the temperature sensor by means of a conducting cable. The microprocessor-based circuitry is housed within the adjustable display panel assembly. The adjustable display panel assembly further comprises a battery power source communicating with and supplying power to the microprocessor-based circuitry. The adjustable display panel assembly further comprises a manual control interface communicating with the microprocessor-based circuitry. The microprocessor-based circuitry monitors both water temperature and the presence or absence of water through the shower arm and the showerhead assembly.

The adjustable display panel assembly further comprises a conductivity sensor. The microprocessor-based circuitry monitor signals from the temperature sensor and the conductivity sensor in order to detect the actual water temperature as it flows through the shower arm and the showerhead assembly. The microprocessor-based circuitry has a programmable memory storage system used for retrieving multi-user temperature settings. The manual control interface is selected from a group consisting of a plurality of buttons, a rotatable knob, or a linear slide control, which may be used to program the desired multi-user temperature settings. The plurality of buttons correspond to the multi-user temperature settings. The adjustable display panel assembly comprises audible alarm means. The microprocessor-based circuitry further comprises a programmable predetermined temperature warning set within the programmable memory storage system. The audible alarm means engage when the predetermined temperature is surpassed to provide protection from scorching. The temperature sensor is selected from the group consisting of a thermocouple, a thermistor, a Resistance Temperature Detector (RTD), an integrated circuit temperature sensor, or a temperature-to-fluid pressure transducer. The conducting cables are removable from the display panel housing. The battery power source is an electric battery, which may be an electric dry cell battery. The audible alarm means is selected from the group consisting of an electromechanical buzzer, a piezo transducer, or a speaker tone driver circuit.

The sensor-coupling unit is generally cylindrical having first and second ends, the first end having female threading and the second end having male threading. The first end removably secured to the shower arm and the showerhead removable secured to the second end. The panel support bracket comprises a cylindrical ring, the sensor-coupling unit snugly fitting within the cylindrical ring. The adjustable display panel assembly connects to a flexible joint to allow the adjustable display panel to swivel, slide, or shift position in order to provide an alternate viewing angle.

It is therefore one of the main objects of the present invention to provide a digital readout of water temperatures having the device directly attached to an existing shower arm.

It is another object of the present invention to provide a digital readout of water temperatures having the device directly attached to an existing showerhead.

It is still another object of the present invention to provide a digital readout of water temperatures having an adjustable panel support bracket.

It is yet another object of the present invention to provide a digital readout of water temperatures having an adjustable display panel.

It is yet another object of the present invention to provide a digital readout of water temperatures having its display panel be removable for installation simplicity.

It is yet another object of the present invention to provide a digital readout of water temperatures having its display panel be angular adjustable in order to provide the optimal viewing angle.

It is yet another object of the present invention to provide a digital readout of water temperatures having a connector be removable from the display panel for installation simplicity.

It is yet another object of the present invention to provide a digital readout of water temperatures and monitors both temperature and the presence or absence of water through the device and the showerhead.

It is yet another object of the present invention to provide a digital readout of water temperatures having a programmable retrievable memory for multi-user temperature settings.

It is yet another object of the present invention to provide a digital readout of water temperatures having a programmable scorch temperature-warning setting.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Referring now to the drawings, where the present invention is generally referred to with numeral 10, it can be observed that it basically includes sensor-coupling unit 20, panel support bracket 40, and display panel assembly 60.

Figure 1:
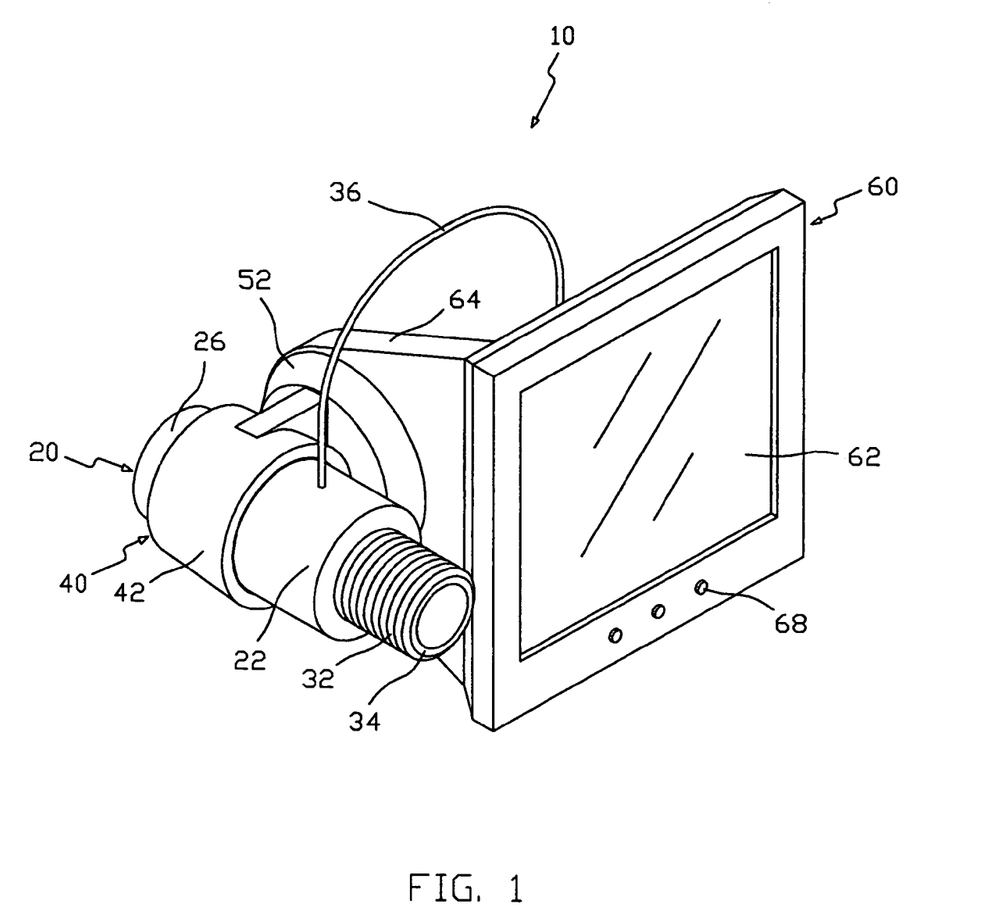
FIG. 1 represents an isometric view of the present invention.

As shown in FIG. 1, panel support bracket 40 slides onto and is snugly secured onto sensor-coupling unit 20, which is removably attached to display panel assembly 60.

Figure 2:
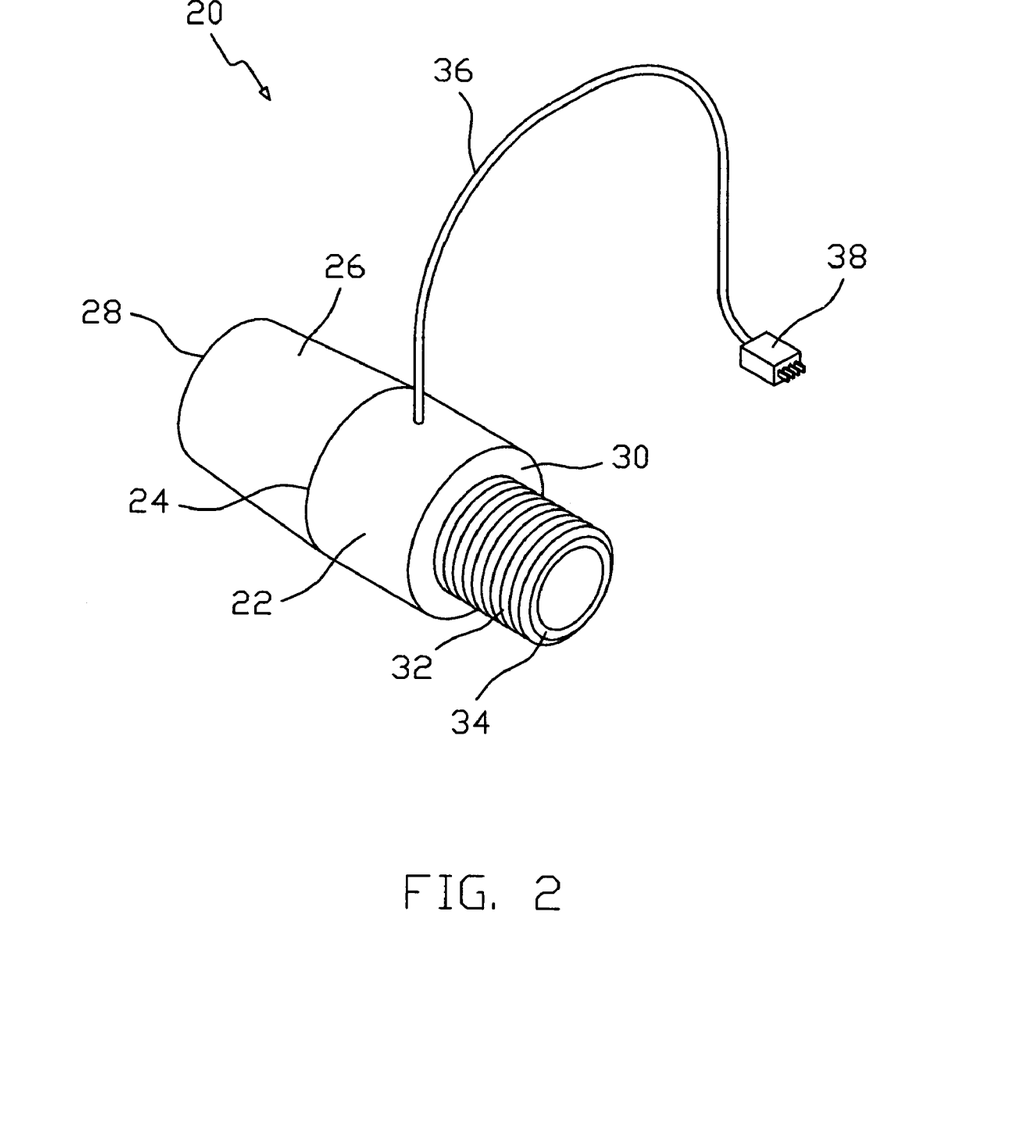
FIG. 2 shows an isometric view of the sensor-coupling unit.
Figure 2A:
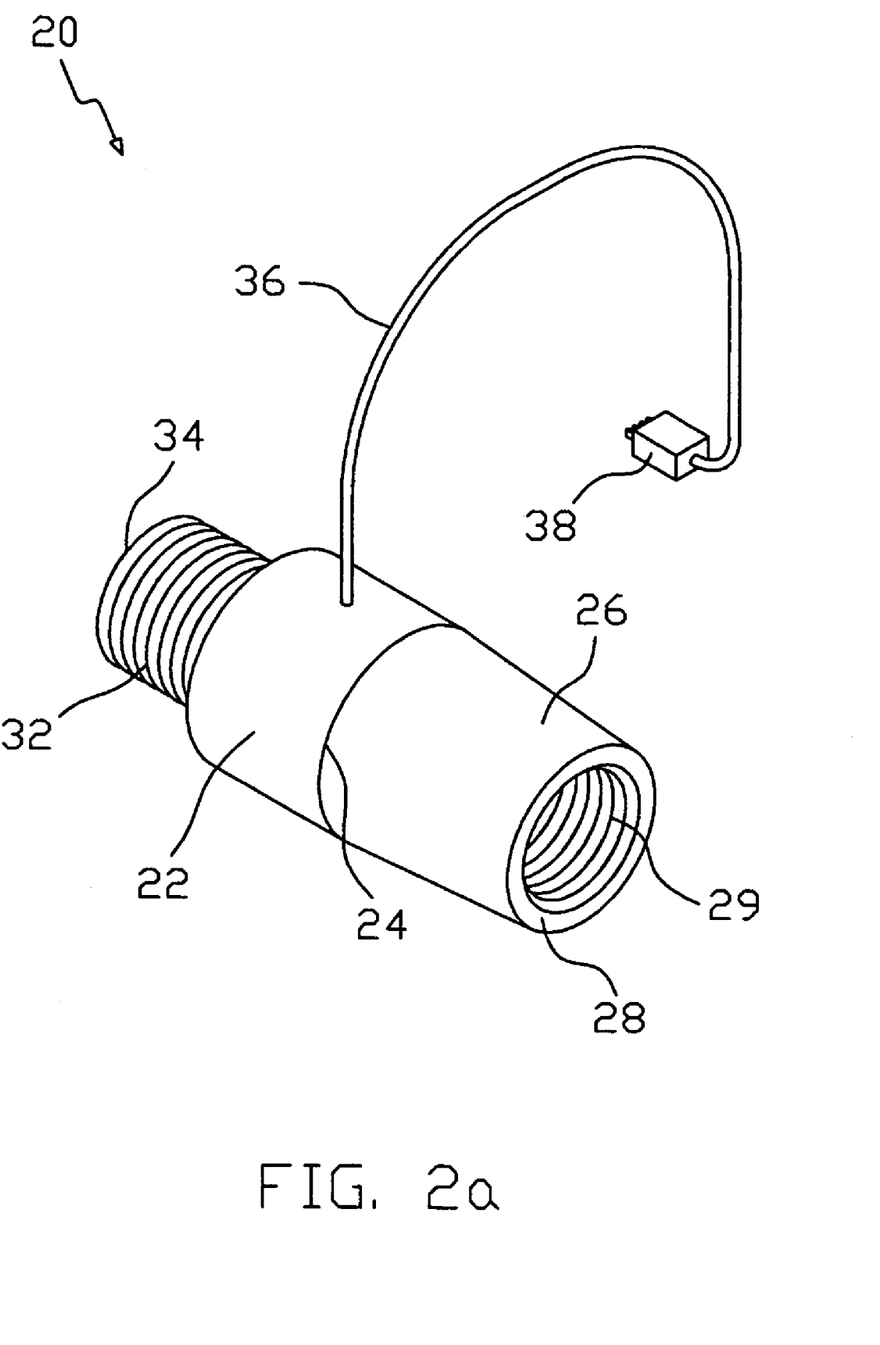
FIG. 2a shows a second isometric view of the sensor-coupling unit.

As seen in FIGS. 2 and 2a, sensor-coupling unit 20 comprises male thread 32 outwardly extruding from face 30 and terminating at edge 34, and female thread 29 intrudes within sensor-coupling unit 20 a predetermined distance from edge 28. Approximately perpendicularly extending from face 30 is cylindrically shaped face 22 that extends to ridge 24. Cone 26 tapers slightly from ridge 24 and terminates at edge 28. Extending from face 22 is connecting cable 36, which terminates at connector 38. Connector 38 plugs into a port, not seen, opposite display panel 62 of display panel assembly 60.

Figure 3:
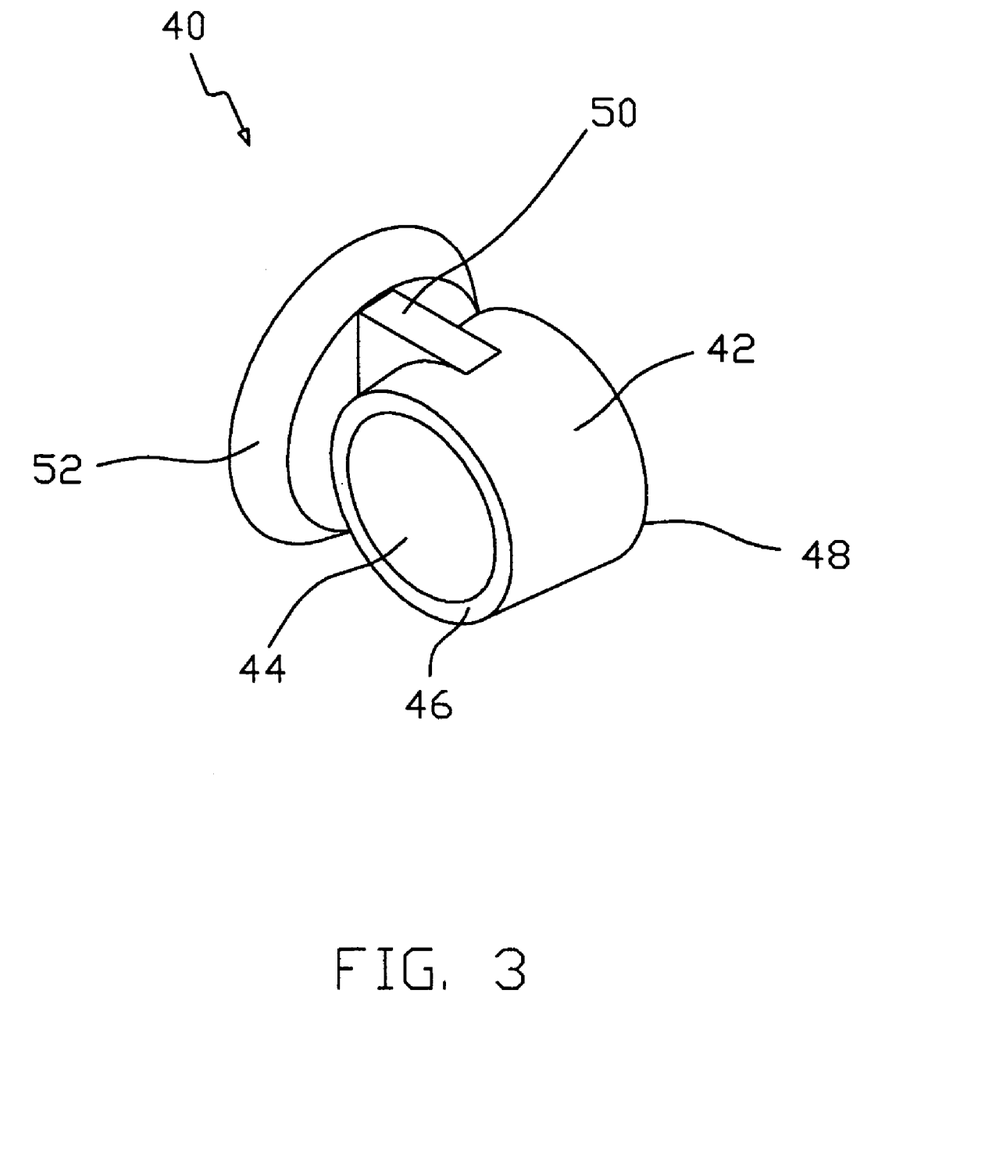
FIG. 3 shows an isometric view of the panel support bracket.

As seen in FIG. 3, panel support bracket 40 comprises base 52. Approximately perpendicularly extending from base 52 is frame 50, which secures to tapered ring 42. Tapered ring 42 has interior wall 44 and edges 46 and 48. Tapered ring 42 has cooperative characteristics to snugly fit onto cone 26.

Figure 4:
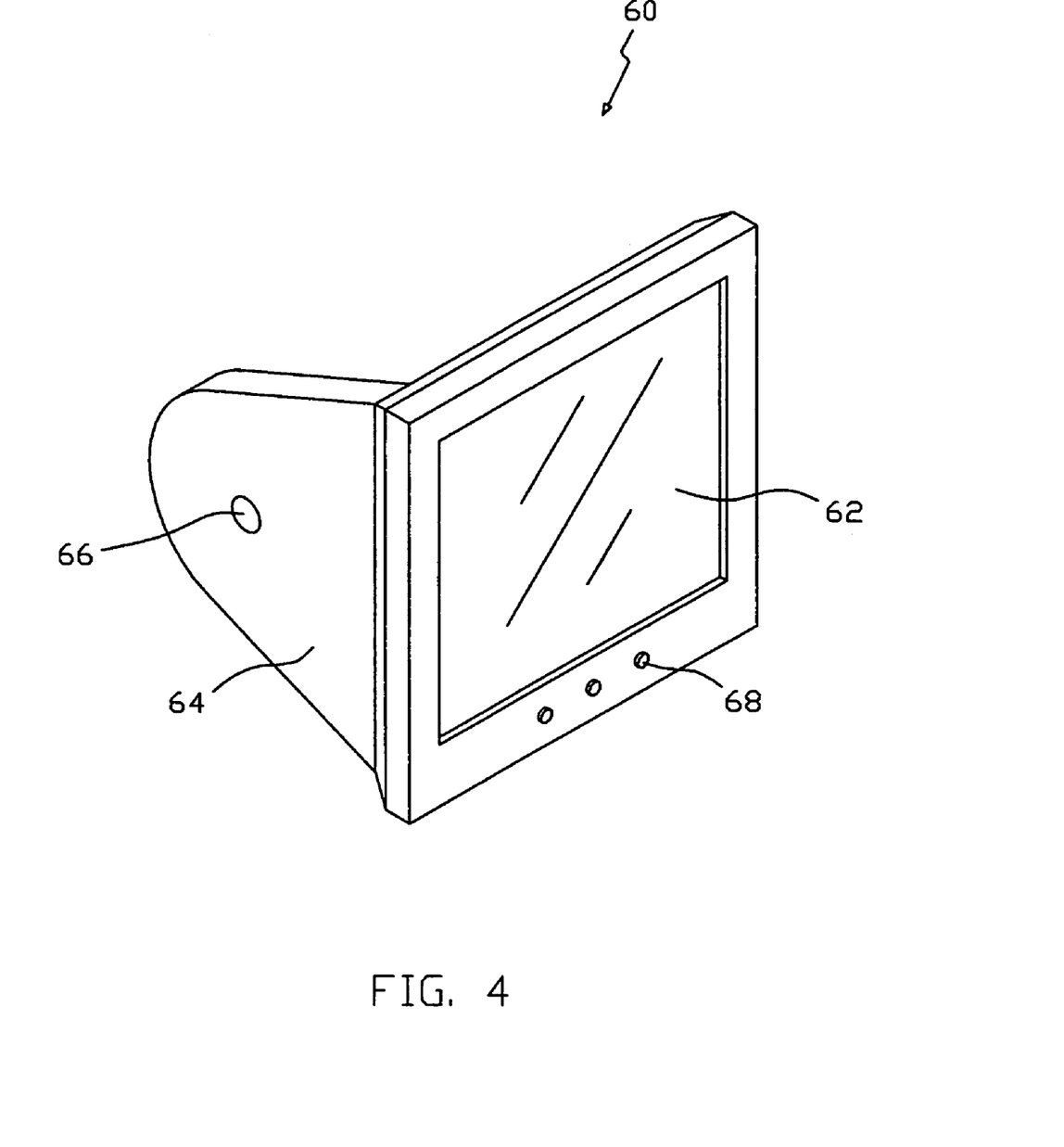
FIG. 4 shows an isometric view of the display panel assembly.

As seen in FIG. 4, display panel assembly 60 comprises frame 64. Frame 64 has through-hole 66 to provide for means to removably secure to base 52. Such means may be a screw that trespasses through-hole 66 and attaches to base 52 for example. Display panel assembly 60 also has display panel 62 and buttons 68.

Figure 5:
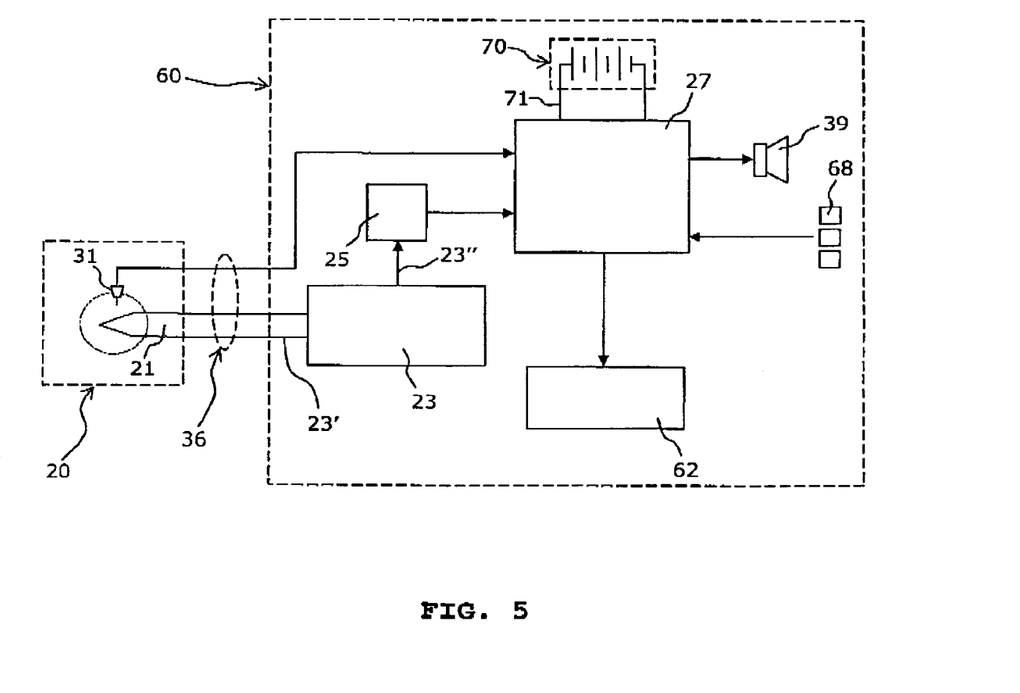
FIG. 5 is a schematic illustration of the temperature display circuit.

Referring to FIG. 5, embedded within the sensor-coupling unit 20 is a thermocouple sensor 21 in the preferred embodiment. Thermocouple sensor 21 responds to temperature changes within the sensor-coupling unit 20. The thermocouple sensor 21 generates a thermoelectric voltage in the temperature gradient that exists between a hot (junction exposed to the temperature being measured) and cold junctions. A cold-junction compensator 23 is used to develop a compensation signal, which automatically varies with the cold junction temperature in such a way to maintain the output signal constant for a constant temperature measurement.

Analog-to-digital device 25 receives the linear voltage over the range of interest and processes the signal to the microprocessor 27 to translate and display as the actual temperature reading on the display panel 62, which in the preferred embodiment is a liquid crystal display (LCD).

Also embedded within the sensor-coupling unit 20 is a conductivity sensor 31 for detecting the presence of water within the sensor-coupling unit 20. The conductivity sensor 31 consists of metal measuring electrode(s), not seen, that monitor the presence of water by one of two basic methods. One measures conductivity by a fixed voltage between electrodes so that the resulting current flow is directly proportional to the conductivity. On the other hand, the electrodes can be supplied with a current flow so that the potential between the electrodes are directly proportional to the resistance of the water, which is the reciprocal of its conductivity.

A main operation of microprocessor 27 is to monitor signals from the thermocouple sensor 21 and conductivity sensor 31 simultaneously, in order to detect actual water temperature as it discharges. When water flow ceases to discharge out the showerhead 86, seen in FIG. 6, it also ceases to be present at sensor-coupling unit 20. Therefore, by monitoring the conductivity inside the sensor-coupling unit 20, instant invention 10 can detect when water is no longer present at the showerhead 86. Microprocessor 27 commands will then halt the displaying of temperature and redirect its instructions to display a text message indicating that water is no longer present. Microprocessor 27 defining part of the microprocessor-based circuitry seen in FIG. 5, has a programmable memory storage system, not seen, used for retrieving multi-user temperature settings.

An additional essential feature of instant invention 10 allows users to save desired shower temperature settings into memory and recall them later in time with push buttons 68. The instant invention 10 can save user temperatures along with unique user identification with the programmable memory storage system, within microprocessor 27, for future association purposes. When a user turns on hot and cold water, an indeterminate amount of time elapses until the desired water temperature arrives at the showerhead 86. This waiting period can be exacerbated if extreme cold or hot ambient temperatures exist in relation to the desired temperature. The present invention 10 alerts users when the shower temperature has reached their desired setting by producing an audible tone with buzzer 39 that can be silenced by the user entering the shower. As a safety feature, a warning tone alerts a user to potential scorching if the temperature has passed a preprogrammed temperature setting. This allows a user to correct the temperature safely before entering the shower. It is noted that the instant invention is powered by a battery power source such as an electric battery, which is not seen in FIG. 5 for simplicity. The electric battery may be an electric dry cell battery.

Figure 6:
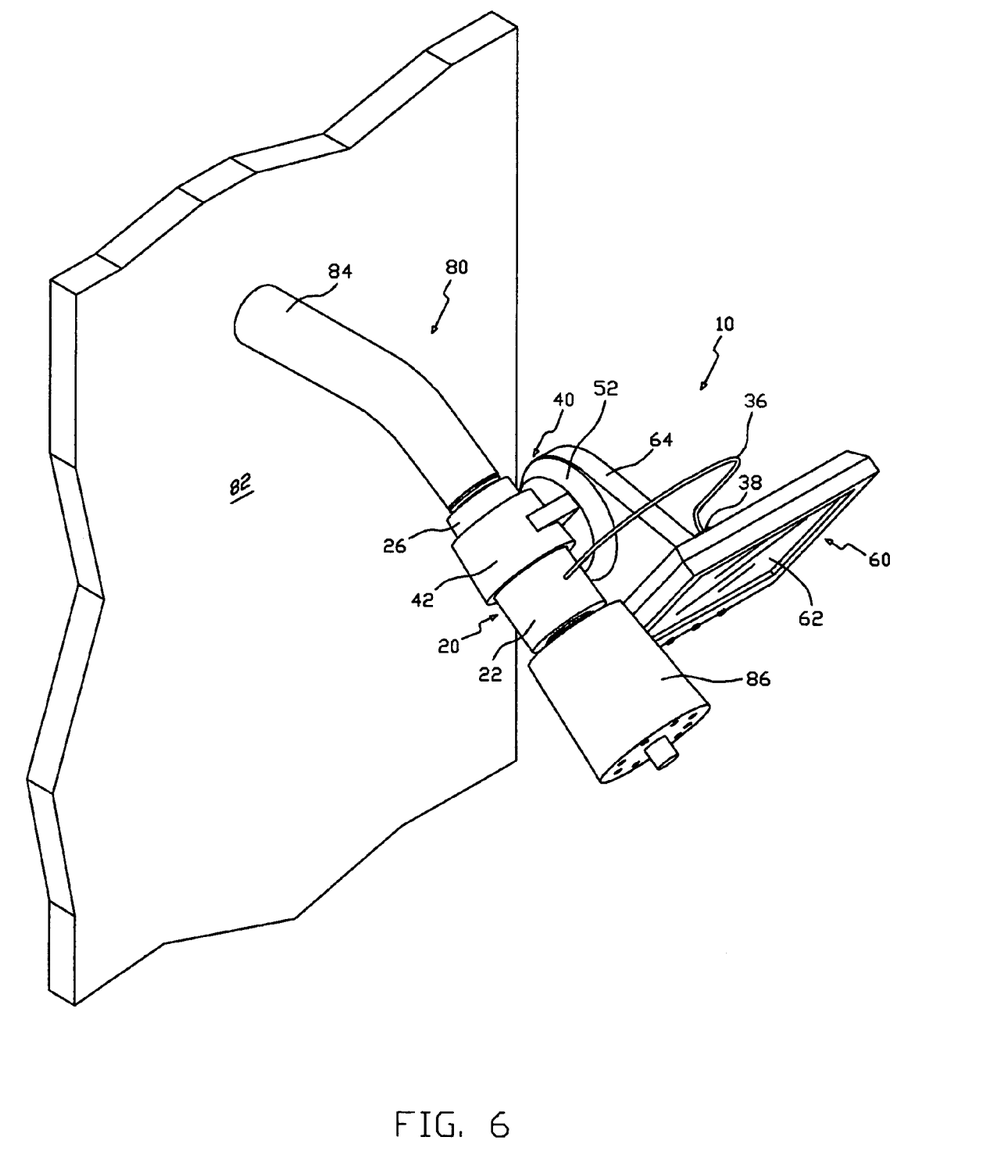
FIG. 6 is an isometric view of the present invention installed on a shower assembly.

Referring to FIG. 6 for installation, shower assembly 80 comprises wall 82. Protruding from wall 82 is shower arm 84, and removably secured onto shower arm 84 is showerhead 86. Sensor-coupling unit 20 is detachable from panel support bracket 40 to allow installation simplicity. Sensor-coupling unit 20 attaches directly onto existing standard shower arm 84 by first removing the existing showerhead 86. After existing showerhead 86 is removed and placed aside, ring 42 from panel support bracket 40 is slipped along shower arm 84. While the panel support bracket 40 hangs on the shower arm 84, the female end, at edge 28, of the sensor coupling unit 20 is attached to the shower arm 84 by rotating clockwise until it tightens. The panel support bracket 40 is then slid down the shower arm 84 until it snugly mounts upon the sensor-coupling unit 20. Finally, display panel assembly 60 is ready for attaching to the panel support bracket 40.

Sensor-coupling unit 20, panel support bracket 40, and display panel assembly 60 can be maintained joined and installed in a single step; although, separating the units proves to be more comfortable for installation purposes. Once all the units are assembled, the terminating connector 38, better seen in FIG. 2, from the connecting cable 36 can be plugged into the port, not seen, of display panel assembly 60. At this time the instant invention 10 can be switched on. Users have the ability to tilt and swivel the display panel 62 at any time to the desired viewing angle. The present invention's uniqueness is its straightforwardness installation process.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electronic shower temperature display device, comprising:

A) a sensor-coupling unit having a substantially cylindrical shape with first and second ends, said first end having female threading and said second end having male threading, said first end being removably secured to said shower arm and said shower head being removably secured to said second end including a temperature sensor;

B) a panel support bracket comprising a cylindrical ring, and said sensor-coupling unit snugly fitting within said ring; and C) a temperature display adjustable display panel assembly including audible alarm means having a microprocessor with means to display real-time water temperature, said microprocessor communicating with said temperature sensor by means of a conducting cable, said microprocessor-based circuitry housed within said adjustable display panel assembly, said adjustable display panel assembly further comprising a battery power source including an electric dry cell battery communicating with and supplying power to said microprocessor-based circuitry, said adjustable display panel assembly further comprising conductivity sensor, connected to said microprocessor to monitor signals from said temperature sensor and said conductivity sensor there detecting the water temperature passing through said shower arm and said showerhead assembly, said microprocessor-based circuitry including a programmable memory storage system used for retrieving multi-user temperature settings having at least one programmable predetermined temperature warning set to activate said audible alarm means.

* * * * *